UNITED STATES PATENT OFFICE.

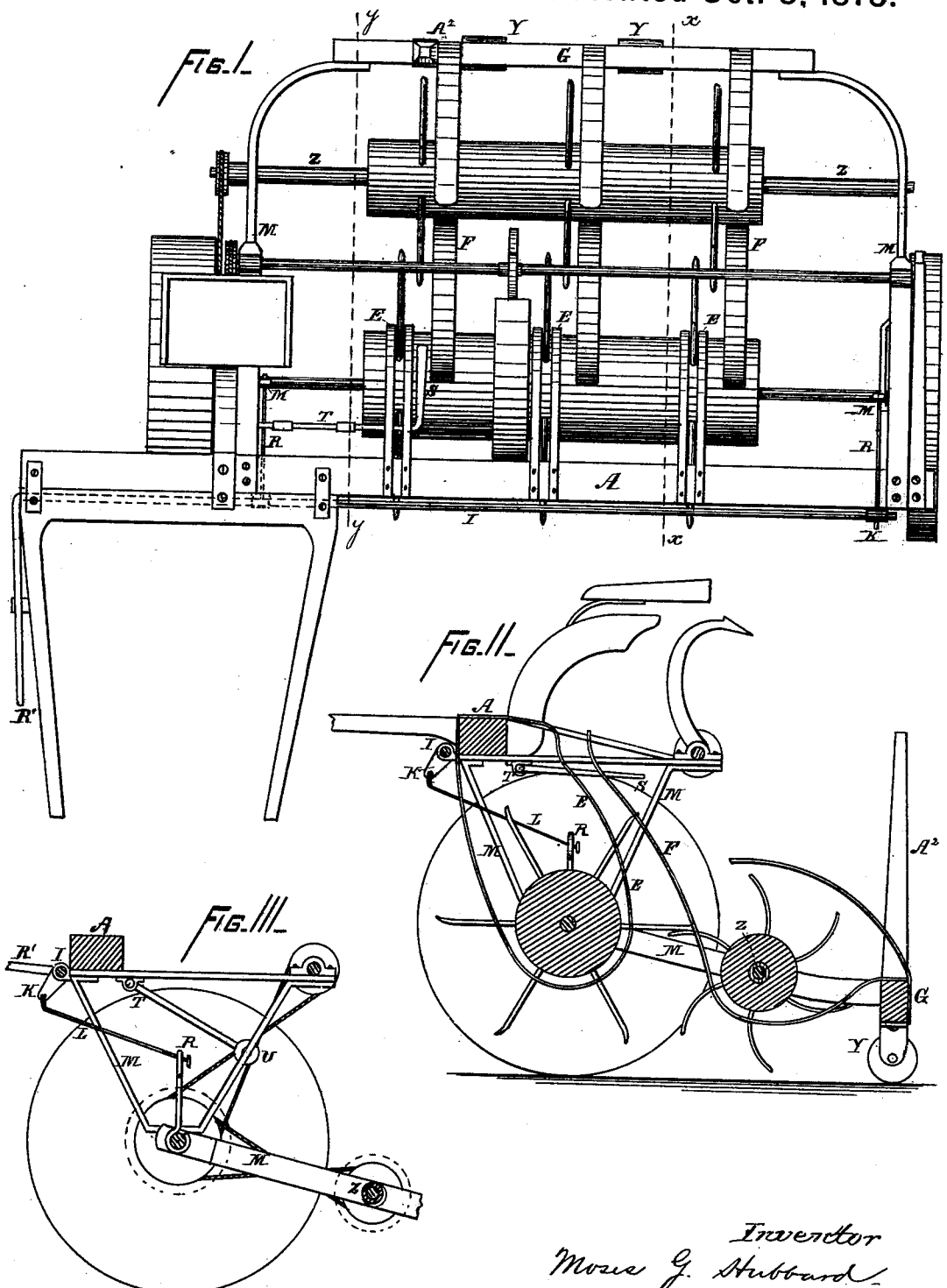

MOSES G. HUBBARD AND JOSIAH D. HEEBNER, OF NORRISTOWN, PA.

IMPROVEMENT IN GRAIN GLEANER AND BINDER.

Specification forming part of Letters Patent No. 208,737, dated October 8, 1878; application filed June 12, 1878.

*To all whom it may concern:*

Be it known that we, MOSES G. HUBBARD and JOSIAH D. HEEBNER, of Norristown, in the county of Montgomery and State of Pennsylvania, have invented new and useful Improvements in Machines for Gleaning and Binding Grain; and we do hereby declare the following to be a full, clear, and exact description thereof, reference being had to the accompanying drawings, which form part of this specification, and in which—

Figure I is a plan view of our improved machine; and Fig. II, a vertical sectional view of the same through the line *x x*, Fig. I. Fig. III is a vertical sectional view through the line *y y* of Fig. I.

Similar letters of reference refer to corresponding parts on all the figures.

Our invention consists of a light, portable machine, easily drawn by one horse and controlled by a boy, which, when passing over a field of grain, cut and deposited in gavels by a reaping-machine, gleans and elevates the grain from the ground up into a grain-receptacle, where, by any suitable mechanical device, it may be bound and then delivered in bound bundles upon the ground.

The gavels may be bound by any of the ordinary mechanical devices for that purpose; but the improvements which we desire to secure by the present application relate more especially to the gleaning and elevating the grain and facilitating the delivery of the bundles.

The greatest difficulty in constructing a successful gleaner and binder to follow an ordinary reaper has been to take up the gavel from the ground as it is left by the reaper. We never succeeded in doing this satisfactorily until we imitated the ordinary motion of the human arms in taking up the gavels from the ground. This we have discovered we can do by passing over the gavel a pair of revolving toothed cylinders, the front one revolving in the same direction of the driving-wheel, and the other in the opposite direction.

The front cylinder may be revolved by keying it to the main shaft, to which the driving-wheel is attached, and the rear cylinder may be revolved in the opposite direction by a pair of ordinary cog-wheels, but more conveniently by a crossed band or chain running on grooved pulleys.

The rear cylinder may be considerably smaller than the front one, but if made smaller, it must revolve proportionally faster, in order that the points of all the teeth in contact with the gavel shall move with about equal speed.

All previous machines for this purpose have been so proportioned that they required either additional wheels to support them, or placed the weight too much on the horse's back, or required the operator to be located so far back that he could not readily see the gavels to drive properly. To remedy this we have discovered that by the use of the elastic grain-compressors F F the grain-receptacles may be nearly vertical, thereby narrowing up the machine, and enabling us to locate the binder shaft and arm on the rear of the machine, which so distributes the weight as to locate the driver over the driving-wheel, where his weight will not interfere with the balancing of the machine, and on the extreme front of the machine, where he has full view of the gavels, and at the same time enables us to construct the frame of one large strong piece of timber, A, without any rear sill to interfere with the rotation of the binder-arm, which, with the main shaft, we attach by iron brackets, as shown. We also attach the thills and the seat to this same strong piece of timber, thus obtaining by this simplest form of construction the greatest possible rigidity, strength, and compactness.

The main elevating-cylinder is keyed to the main shaft, and constructed with suitable elevating-teeth as shown; and we locate a similar gleaning-cylinder immediately in its rear, which is provided with similar teeth, and these two are revolved in opposite directions. This gleaning-cylinder is hinged to the main shaft by arms M M, and the rear bearings in these arms are fitted loosely, so that either end of the gleaner-cylinder may rise or fall independently of the other. A light sill, G, is attached to the rear of this cylinder, and to this sill the elastic compressors are attached, and extend down under the cylinder and up in front of it, thus acting both as elastic compressors for the vertical grain-receptacle and as cleaning-scrolls for the teeth of the gleaner-cylinder.

The frame A being located nearly over the main shaft, on which the main elevating-cylinder is mounted, the cleaning and carrying scrolls E E may extend up nearly vertically, and be attached at their upper ends firmly to the frame A. These carrying-scrolls, with the elastic grain-compressors F F, not only form what we call a "yielding vertical grain-receptacle," in which the gavel is held until removed by the binder-arm, but they also form the cleaning-scrolls, to clear the straw from the teeth of the cylinders.

As the gleaning-cylinder is flexibly attached, it is necessary to elevate it considerably from the ground for transportation, and as it is flexible at both ends, a raising-lever must connect with both the inner and outer ends, to elevate it by one operation. For this purpose the small shaft or rod I extends from the lever R' outward along the frame A, and on this shaft are the small arms K K, which connect with the arms R R, extending up from the arms M M, by the links L L, which are bent upward at their front ends sufficiently to permit the arms K K to pass up beyond the center of shaft I, and thus the raising-lever becomes self-sustaining, which adds greatly to its convenience.

It is necessary that the binder-arm should be stationary while the gavel is being elevated and thrown into gear at the right time for binding the bundle. This has been done heretofore by the driver with a device for this purpose, which he could operate with his hand or his foot; but this process requires constant and careful watching, and takes the driver's attention from guiding the horse. To relieve the operator from this labor, we construct an automatic device which will throw the binder-arm into gear at the proper time for binding the bundle, without any attention from the driver.

One of the convenient forms of such an automatic device, which we have tried for this purpose, consists of a small arm, S, projecting through the grain-scrolls, as shown, and attached to a rod or small rock-shaft, T, which extends to the inner end of the machine, and there turns in the form of a crank, on which is a small tightened pulley, U, against the band, and causes it to rotate the binder-shaft arm. The gavel, in being elevated into the grain-receptacle, forces up the said arm, thus slightly rotating the rod or rock-shaft T, and thereby the binding-arm is caused to rotate and bind the gavel, as described.

To sustain the gleaning-cylinder in a proper position at all times, we attach two rollers, Y Y, under the rear sill, near the center of the machine, and at the proper distance apart to enable one roller to support the rear of the machine while the other is rolling diagonally over a dead furrow; and we find the practical operation of the machine in a field having the ordinary dead furrows to be greatly improved by so locating these rollers that either one will be near enough to the center to carry the gleaner-cylinder while the other is passing lengthwise or diagonally over the dead furrow.

The rear shaft, being so near the ground, is liable to wind up loose straws and cause considerable trouble thereby. To prevent this we inclose its ends, which project beyond the cylinder, in the stationary tubes Z Z, which are held from revolving by their attachment to the arms M M.

In following a reaper the horse walks in the track of the reaper; but in binding long grain, after the reaper has been more than once around, the ends of the bound bundles come so near the ends of the unbound gavels as to leave no track for the horse and driving-wheel without hitting the ends of some of them. To overcome this we attach a track-clearer to the rear of the machine, on either side of the binder-arm, to turn the bound bundles lengthwise as they are thrown off from the machine. One of the convenient forms of track-clearers which we have successfully tried for this purpose consists of an upright smooth round post, $A^2$, attached to the rear sill, and projecting upward sufficiently to check the motion of one end of the bundle as it is thrown off, and thus causing it to fall in a lengthwise position on the ground, and thereby leave sufficient track for the horse and driving-wheel on the next round.

As reaping-machines usually cut a swath about five feet wide, the gleaner and binder may be proportioned to this width; but as some reapers vary from this width, our track-clearer is also important to compensate for this variation.

The ends of the cylinder-teeth, when straight, have a tendency to carry the straw through or beyond the cleaning-scrolls. To prevent this we curve them slightly in a direction contrary to their motion. This also facilitates their sliding over obstacles or on the surface of the ground when in contact therewith.

Having thus fully described our improvements in the gleaner and binder, what we claim as new, and desire to secure by Letters Patent, is—

1. In a gleaning and binding machine, a pair of toothed cylinders revolving in opposite directions for gleaning and elevating the gavel, in combination with a suitable receptacle for holding the gavel where it can be bound by automatic binding mechanism, substantially as shown and described.

2. In a gleaning and binding machine, a vertical, or nearly vertical, grain-receptacle formed by the carrying-scrolls E E and the elastic grain-compressors F F, in combination with an automatic binding-arm, substantially as shown and described.

3. In a gleaning and binding machine, the single beam A, extending entirely across the machine above the elevating-cylinder, and serving as a means of support and attachment for the several parts, substantially as shown and described.

4. A self-sustaining raising-lever, in combination with the gleaning device of a gleaning and binding machine, substantially as shown and described.

5. In a gleaning and binding machine, the main or front cylinder provided with teeth for elevating the grain, in combination with the binder-arm shaft, connecting-belt, arm S, shaft T, and tightening-pulley U, substantially as shown, and for the purpose specified.

6. In a gleaning and binding machine, the two carrying-rollers Y Y, located under the rear sill and near the center of the machine, substantially as shown, and for the purpose specified.

7. In a gleaning and binding machine, the track-clearer $A^2$, or its equivalent, for turning the bundles out of the path of the horse, substantially as shown and described.

8. The combination of the reversely-rotating elevating and gleaning cylinders of a gleaning and binding machine provided with teeth which are curved at their ends or points, substantially as shown, and for the purposes specified.

The foregoing specifications and claims signed by us this 25th day of May, A. D. 1878.

MOSES G. HUBBARD.
JOSIAH D. HEEBNER.

Witnesses:
JAS. W. SCHNACK,
FREDERICK BELCHER.